United States Patent [19]

Vandenboom

[11] Patent Number: 4,844,649
[45] Date of Patent: Jul. 4, 1989

[54] BRACKET ASSEMBLY FOR GEODESIC DOME

[76] Inventor: James J. Vandenboom, 2828 E. Hiepas St., Appleton, Wis. 54915

[21] Appl. No.: 238,392

[22] Filed: Aug. 30, 1988

Related U.S. Application Data

[63] Continuation-in-part of Ser. No. 40,122, Apr. 20, 1987, abandoned.

[51] Int. Cl.[4] .............................................. F16B 7/00
[52] U.S. Cl. .................................... 403/172; 403/174; 403/237
[58] Field of Search ........................ 403/172, 237, 174; 52/81

[56] References Cited

U.S. PATENT DOCUMENTS

| | | | |
|---|---|---|---|
| 408,750 | 8/1889 | Rockwell et al. | 403/237 X |
| 2,117,095 | 5/1938 | Irwin | 403/237 |
| 3,635,509 | 1/1972 | Birkemeier | 52/81 X |
| 4,131,440 | 12/1978 | Aurell | 403/237 X |
| 4,262,461 | 4/1981 | Johnson et al. | 403/172 X |
| 4,365,910 | 12/1982 | Ford | 403/172 |
| 4,432,661 | 2/1984 | Phillips et al. | 403/172 |

Primary Examiner—Andrew V. Kundrat
Attorney, Agent, or Firm—Andrus, Sceales, Starke & Sawall

[57] ABSTRACT

A bracket assembly for interconnecting support struts of the framework of a domical structure such as a geodesic dome. The bracket assembly includes a central annular hub member and a bracket member for interconnecting each of a plurality of circumferentially arranged and radially extending struts to the hub member. The outer end of each bracket member includes a pair of spaced apart side members which straddle the strut and are mounted to the strut by a pair of bolts. The inner end of each bracket member includes a pair of axially spaced apart triangularly shaped bosses located on opposite ends of the hub which are mounted to the hub by a bolt extending through both bosses at a location spaced radially inwardly of the hub member.

3 Claims, 1 Drawing Sheet

BRACKET ASSEMBLY FOR GEODESIC DOME

BACKGROUND OF THE INVENTION

Cross Reference to Related Application

This application is a continuation-in-part of copending prior application Ser. No. 40,122 filed Apr. 20, 1987, now abandoned.

The present invention relates to domical structures such as geodesic domes, and more particularly to a bracket assembly for interconnecting support struts of the framework of a geodesic dome.

Domical structures such as geodesic domes are typically composed of a framework of struts which form a plurality of triangles. Each triangle, of course, is comprised of three struts two of which must be connected together at their common joint with adjacent pairs of struts. Typically, at least six and sometimes eight struts must be joined together at their common node or intersection. Therefore, it is desirable to provide an arrangement for connecting these struts which is adjustable for manufacturing tolerances, easy to assemble and sturdy in design.

Various types of interlocking connections are known, and the following patents illustrate and describe some of such connections.

| Patent No. | Inventor | Issue Date |
|---|---|---|
| 3,950,901 | Sumner | April 20, 1976 |
| 4,009,543 | Smrt | March 1, 1977 |
| 4,068,422 | Sumner | Jan. 17, 1978 |
| 4,245,809 | Jackson | Jan. 20, 1981 |
| 4,509,879 | Pearce | April 9, 1985 |
| 4,523,412 | Sielaff | June 18, 1985 |
| 4,551,960 | Fleishman | Nov. 12, 1985 |

SUMMARY OF THE INVENTION

A bracket assembly for interconnecting support struts of the framework of a domical structure such as a geodesic dome. The bracket assembly includes a central hub member which defines an axis and a plurality of circumferentially arranged mounting locations orientated substantially in alignment with a plurality of struts extending substantially radially toward the axis, and a bracket member for interconnecting a strut and the hub member. The assembly includes first and second mounting means for mounting the inner and outer ends of the bracket member to the hub member and strut respectively.

The central hub member is preferably an annular hollow sleeve member, and the bracket member includes a pair of spaced apart side members located on opposite sides of the strut which are preferably flat plates located flush against the opposite sides of the strut. Bolts extending through the strut and both flat plates mount the outer end of the bracket member to the strut.

The bracket member also includes a pair of axially spaced apart bosses at its inner end located on opposite ends of the hub member which project radially inwardly of the hub member so that a bolt may extend through both of the bosses at a location spaced radially inwardly of the hub member to mount the inner end of the bracket member to the hub member so that the bracket member is radially and circumferentially adjustable with respect to the hub member during assembly of the framework.

The present invention thus provides a sturdy and rigid bracket assembly which is easy to manufacture, easy to assemble and which is readily adjustable to take up manufacturing tolerances in building materials.

BRIEF DESCRIPTION OF THE DRAWINGS

The drawing illustrates the best mode presently contemplated of carrying out the invention.

In the drawings.

DESCRIPTION OF THE PREFERRED EMBODIMENT

Figure 1:
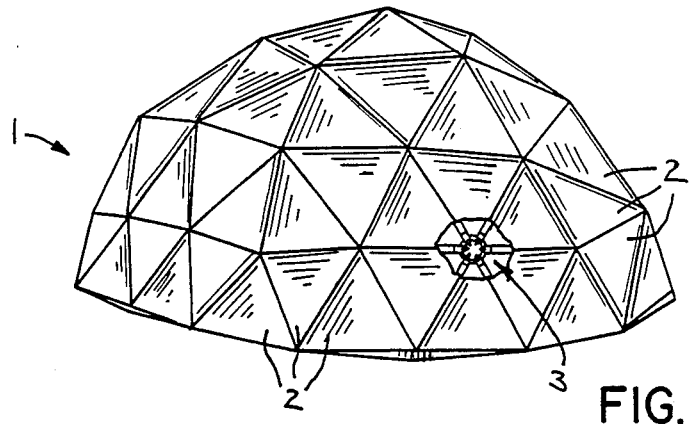
FIG. 1 is a perspective view of a geodesic dome with a portion of the structure broken away to illustrate the incorporation of a bracket assembly constructed in accordance with the present invention.

Referring now to the drawings, FIG. 1 illustrates a geodesic dome structure, generally designed by the numeral 1, which includes a plurality of triangles 2. Each triangle 2 is supported by three struts each of which comprises a common leg of adjacent triangles 2.

Figure 2:
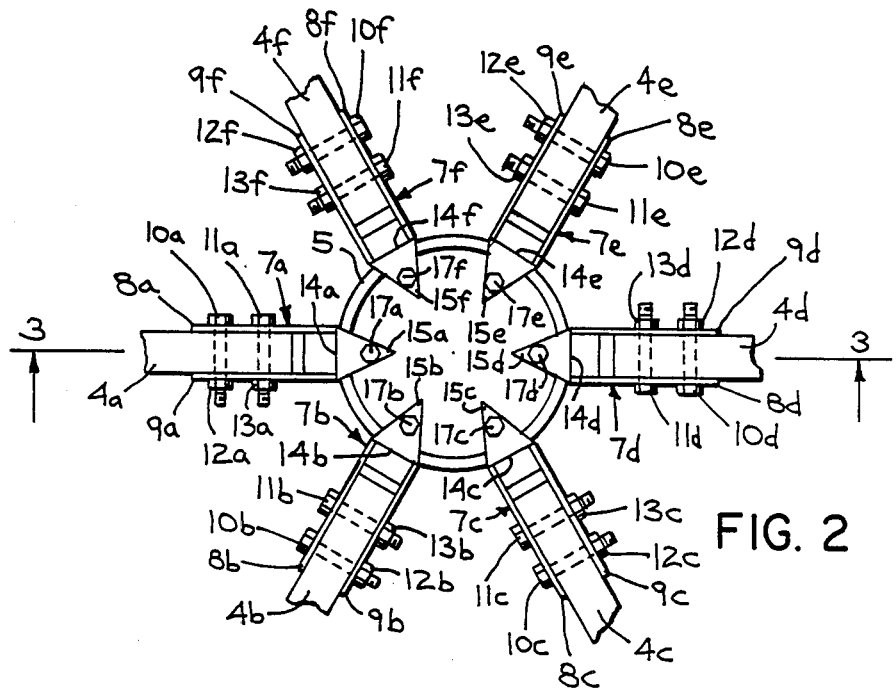
FIG. 2 is a fragmentary plan view of the bracket assembly of FIG. 1.
Figure 3:
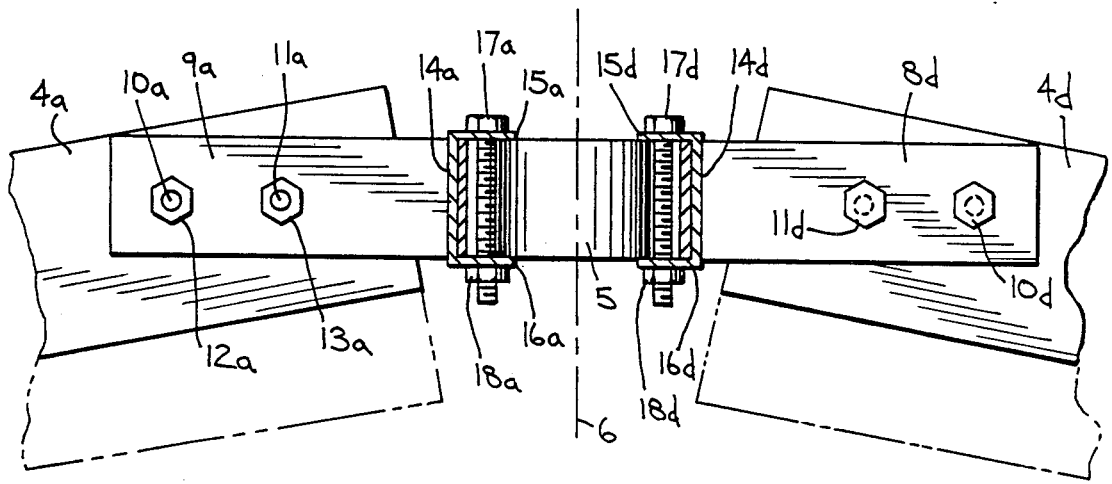
FIG. 3 is a cross sectional view of the bracket assembly taken along the plane of the line 3—3 in FIG. 2.

As shown best in FIG. 2, a bracket assembly generally designated by the numeral 3 is employed for interconnecting a plurality of circumferentially arranged struts 4a-4f of geodesic dome 1. In the illustrated embodiment, bracket assembly 3 is employed to interconnect six struts 4a-4f at their common node or intersection. However, bracket assembly 3 may also be employed to interconnect a greater number of struts or a fewer number of struts if desired. As illustrated in FIG. 3, struts 4a-4f may be conventional 2×4 wooden construction, as illustrated in solid lines, or may be of conventional 2×6 wooden construction, as illustrated in phantom lines.

Referring now more specifically to FIGS. 2 and 3, bracket assembly 3 includes a central hub member 5 in the form of an annular hollow sleeve. Hub 5 may be composed of steel or cast iron, and typically has an outer diameter of 4 inches, an inner diameter of 3½ inches and a length of 2 inches. As shown best in FIG. 3, hub 5 defines a central axis 6, and as shown best in FIG. 2 also defines a plurality of circumferentially arranged mounting locations orientated substantially in radial alignment with struts 4a-4f which extend substantially radially toward axis 6.

Bracket assembly 3 also includes a plurality of bracket members 7a-7f. The number of bracket members correspond to the number of struts in any given intersection, and since each bracket member 7a-7f is identical in structure, only bracket 7a need be described in detail herein. However, like numerals with different subletters correspond to adjacent bracket members.

Bracket member 7a includes an inner end which is mounted to hub 5 and an outer end which is mounted to strut 4a. Bracket member 7a includes a pair of spaced apart side members 8a, 9a which are in the form of flat plates located flush against the opposite sides or surfaces of strut 4a. A pair of bolts 10a, 11a extend through strut 4a and both of side members 8a, 9a to securely mount the outer end of bracket 7a to strut 4a. Nuts 12a, 13a are turned down onto their corresponding bolts 10a, 11a to complete the mounting assembly.

Side members 8a, 9a are connected at the faces of their inner ends to a front plate 14a, which as shown best in FIG. 3, engages or bears against the outer circumferential surface of hub 5. The inner end of bracket member 7a also includes a pair of axially spaced apart triangular shaped bosses 15a and 16a. Bosses 15a, 16a project radially inwardly of hub member 5 at opposite axial ends of front plate 14a and hub member 5. As shown best in FIG. 3, the inner end of bracket member 7a is mounted to hub 5 by means of a bolt 17a which extends through both bosses 15a, 16a at a location spaced radially inwardly of the hub member 5. A nut 18a is turned down upon the end of bolt 17a and tightened against boss 16a to complete the mounting assembly.

A bracket assembly 3 for interconnecting support struts 4a-4f of the framework of a domical structure such as geodesic dome 1 has been illustrated and described. Various modifications and/or substitutions may be made to the specific components described herein without departing from the scope of the invention.

Various modes of carrying out the invention are contemplated as being within the scope of the following claims particularly pointing out and distinctly claiming the subject matter which is regarded as the invention.

I claim:

1. A bracket assembly for interconnecting support struts of the framework of a domical structure, comprising:

a central hub member in the form of an annular hollow sleeve defining an axis and a plurality of circumferentially arranged mounting locations orientated substantially in alignment with a plurality of struts extending substantially radially toward said axis;

a bracket member for interconnecting a strut and the hub member, said bracket member including inner and outer ends having a pair of spaced apart side members located on opposite sides of the strut at said outer end for receiving said strut therebetween and having a front plate at said inner end extending between said side members such that an inner end face of each side member abuts against said front plate and a pair of axially spaced apart bosses connected to said front plate located on opposite axial ends of the hub member projecting radially inwardly of said hub member;

first mounting means for mounting the outer end of said bracket member to the strut; and second mounting means for mounting the inner end of said bracket member to the hub member at one of said mounting locations, said second mounting means includes a bolt extending through both of said bosses at a location radially inwardly of said hub member to provide a space between said bolt and said hub member whereby said bracket member is radially and circumferentially adjustable with respect to said hub member during assembly of said framework.

2. The bracket assembly of claim 1 wherein said side members are flat plates located flush against the opposite sides of the strut.

3. The bracket assembly of claim 2 wherein said first mounting means includes a bolt extending through the strut and both of said flat plates.

* * * * *